United States Patent [19]

James et al.

[11] Patent Number: 5,192,851
[45] Date of Patent: Mar. 9, 1993

[54] CORED ELECTRODE WIRES

[75] Inventors: Horace S. B. James, North Balwyn; Ian E. French, Semaphore Park, both of Australia

[73] Assignee: Commonwealth Scientific and Industrial Research Organization and Welding Industries Limited, Australia

[21] Appl. No.: 641,875

[22] Filed: Oct. 5, 1991

Related U.S. Application Data

[63] Continuation of Ser. No. 555,387, Aug. 3, 1990, which is a continuation of PCT/Au89/00045 filed Feb. 6, 1989 abandoned.

[30] Foreign Application Priority Data

Feb. 5, 1988 [AU] Australia .............................. PI6643

[51] Int. Cl.$^5$ ....................... B23K 9/09; B23K 35/362
[52] U.S. Cl. ........................... 219/130.51; 219/145.22; 219/146.31
[58] Field of Search ................... 219/137 WM, 145.22, 219/146.1, 146.31, 146.32, 130.51

[56] References Cited

U.S. PATENT DOCUMENTS

| | | | |
|---|---|---|---|
| 4,016,399 | 4/1977 | De Haeck | 219/146.1 |
| 4,087,673 | 5/1978 | Kiilunen | 219/137 WM |
| 4,340,805 | 7/1982 | Banks | |
| 4,426,428 | 1/1984 | Kammer et al. | 219/146.32 |
| 4,438,319 | 3/1984 | Blot | |
| 4,782,211 | 11/1988 | Kiilunen | 219/137 WM |

FOREIGN PATENT DOCUMENTS

| | | |
|---|---|---|
| 0032337 | 12/1980 | European Pat. Off. |
| 2612101 | 3/1988 | France |
| 1056804 | 5/1965 | United Kingdom |
| 1154957 | 8/1967 | United Kingdom |
| 2187988A | 9/1987 | United Kingdom |

*Primary Examiner*—Clifford C. Shaw
*Attorney, Agent, or Firm*—Burns, Doane, Swecker & Mathis

[57] ABSTRACT

A cored electrode wire for pulsed electric arc welding, wherein said core includes from 2.5 to 12% calcium fluoride, from 2 to 8% calcium carbonate, from 0.2 to 2% silicon dioxide and from 0.5 to 1.5% of a fused mixed oxide. Also disclosed is a cored electrode wire for pulsed electric arc welding, wherein said core contains from 4 to 15% elemental manganese and from 2 to 8% elemental silicon, the remainder of the core comprising fused mixed oxide, desired alloying components and iron powder. In each of the above cases, the wire is suitable for use with the following welding pulse parameters: pulse energy: 8 to 250 J and preferably 10 to 120 J; pulse frequency: 10 to 500 Hz and preferably 15 to 350 Hz; background current: 8 to 250 A and preferably 10 to 100 A; wire feed speed: 1 to 20 m/min and preferably 4 to 17 m/min.

15 Claims, 3 Drawing Sheets

CORED ELECTRODE WIRES

This application is a continuation of application Ser. No. 07/555,387, filed Aug. 3, 1990 now abandoned, which corresponds to International Application No. PCT/AU89/00045 filed Feb. 6, 1989.

FIELD OF THE INVENTION

This invention relates to cored electrode wires for pulsed electric arc welding and to a pulsed electric arc welding method utilising same.

BACKGROUND OF THE INVENTION

Solid electrode wire generally suffers from lack of versatility in alloy composition, since only large batches are economical, and absence of the protective and cleaning action provided by a slag. In addition, the solid wire/conventional power supply combination can give problems with lack of sidewall fusion in joining thicker sections.

Cored wires offer great versatility with regard to alloy composition since alloy additions are made via the core. They also generally give better sidewall fusion than solid wires. To reliably achieve the good low temperature impact properties and low weld metal hydrogen levels required in certain cases, basic-flux cored or metal cored wires demonstrate considerable advantage compared to alternative slag systems such as rutile ones.

However, the combination of basic cored wire with conventional power supply gives harsh welding operation, can be used only in a narrow range of welding currents, and is not usable for positional welding. The combination of basic cored wire with pulsed power supply, on the other hand, has been found to give good welding behaviour over a wide range of welding currents and to offer an all-position welding capability. Similarly, metal cored wires are only usable at high currents with conventional power supply but, when combined with pulsed power supply give good welding behaviour over a wide range of welding currents and offer all-position welding capability.

SUMMARY OF INVENTION AND OBJECTS

It is therefore an object of a first aspect of the present invention to provide cored electrode wires which are suitable for use with pulsed electric arc welding programs, and to provide a range of programmes suitable for use therewith.

In a first aspect, the invention provides a basic flux cored electrode wire for pulsed electric arc welding, characterised in that the slag forming components contained in the core of said electrode wire are of a lower level than the slag forming components which must be contained in a basic flux cored wire suitable for normal arc welding.

In a preferred form of the first aspect of the invention, the core includes from 2.5 to 12% calcium fluoride, from 2 to 8% calcium carbonate, from 0.2 to 2% silicon dioxide and from 0.5 to 1.5% of a fused mixed oxide.

In a particularly preferred form of the invention, the core includes from 2.5 to 8% calcium fluoride, from 2 to 6% calcium carbonate, from 0.2 to 1% silicon dioxide and from 0.75 to 1.25% fused mixed oxide. In one form, the fused mixed oxide may contain approximately 10% MgO, 15% MnO, 10% $Al_2O_3$, 5% CaO, 60% $SiO_2$.

The above defined electrode is suitable for pulsed arc welding with the following pulse parameters:

| Pulse Energy | 8 to 250 J and preferably 10 to 120 J |
| --- | --- |
| Pulse Frequency | 10 to 500 Hz and preferably 15 to 350 Hz |
| Background Current | 8 to 250 A and preferably 10 to 100 A |
| Wire Feed Speed | 1 to 20 m/min and preferably 4 to 17 m/min |

In a presently preferred form of the invention, the core may have the following composition and is suitable for use with a pulsed electric arc welding program having the following pulse parameters:

Wire Diameters: 0.9 to 1.8 mm
Shielding Gas: Argon-carbon dioxide mixtures containing 2 to 25% $CO_2$ and, in some cases, up to 3% $O_2$.
Proportion of core:
  15 to 28% of total wire weight may be core
  preferably 18 to 25% of core
  specifically 23% core for 1.6 mm dia wires and 21% for 1.2 mm dia wires.

| Core Composition | %age of Core Broad Range | Preferred Range |
| --- | --- | --- |
| Source of elemental Mn (such as silicomanganese or manganese) | 3 to 12 (as Mn) | 5 to 9 |
| Source of elemental Si (such as silicomanganese or ferrosilicon) | 2 to 7 (as Si) | 2 to 5 |
| Calcium fluoride (may be in mineral form) | 2.5 to 12 | 2.5 to 8 |
| Calcium carbonate (may be in mineral form) | 2 to 8 | 2 to 6 |
| Silicon dioxide (may be in mineral form | 0.2 to 2 | 0.2 to 1 |
| Fused mixed oxide (Containing approximately 10% MgO, 15% MnO, 10% $Al_2O_3$, 5% CaO, 60% $SiO_2$) | 0.5 to 1.5 | .75 to 1.25 |
| Source of elemental Cr (such as chromium or ferrochromium) | 0 to 1.5 | depends on alloy required |
| Source of Ni (such as nickel powder) | 0 to 15 | depends on alloy required |
| Source of Mo (such as ferromolybdenum) | 0 to 5 | depends on alloy required |
| Source of Ti (such as ferrotitanium) | 0 to 1.5 (as Ti) | 0 to 0.8 |
| Source of B (such as ferroboron) | 0 to .045 (as B) | 0 to .033 |
| Iron powder | remainder | remainder |

| Pulse Parameters | Range |
| --- | --- |
| Pulse width (ms) | 2 to 6 |
| Peak current (A) | 400 to 550 |
| Minimum Pulse Frequency (Hz) | 15 to 80 |
| Maximum Pulse Frequency (Hz) | 120 to 300 |
| Minimum Background Current (A) | 15 to 50 |
| Maximum Background Current (A) | 15 to 80 |
| Minimum Wire Speed (m/min) | 1.56 to 4.55 |
| Maximum Wire Speed (m/min) | 6.50 to 16.90 |

The specific combination of parameters needs to be optimized for each specific wire.

In a second aspect, the invention provides a method of operating a pulsed electric arc welding apparatus using a cored electrode wire having a basic core composition comprising the steps of adjusting the parameters of the pulse program of the apparatus in accordance with the following:

| Pulse Energy | 8 to 250 J and preferably 10 to 120 J |
| Pulse Frequency | 10 to 500 Hz and preferably 15 to 350 Hz |
| Background Current | 8 to 250 A and preferably 10 to 100 A |
| Wire Feed Speed | 1 to 20 m/min and preferably 4 to 17 m/min |

More specifically, the following parameters may be used:

| Pulse Parameters | Range |
| --- | --- |
| Pulse width (ms) | 2 to 6 |
| Peak current (A) | 400 to 550 |
| Minimum Pulse Frequency (Hz) | 15 to 80 |
| Maximum Pulse Frequency (Hz) | 120 to 300 |
| Minimum Background Current (A) | 15 to 50 |
| Maximum Background Current (A) | 15 to 80 |
| Minimum Wire Speed (m/min) | 1.56 to 4.55 |
| Maximum Wire Speed (m/min) | 6.50 to 16.90 |

In a particularly preferred form of this aspect, the core composition of the electrode wire is in accordance with the definition of the first aspect of the invention appearing above.

In a third aspect of the invention, the invention provides a cored electrode wire for use with pulsed electric arc welding, characterised in that the core contains a metal powder composition having less manganese and silicon than would be required for a cored wire for use with normal electric arc welding.

It will be appreciated that the inclusion of manganese and silicon in a cored wire for use with normal electric arc welding influences the running characteristics and bead shape of the weld metal. If insufficient manganese and silicon are included in the core, the bead shape will be poor and the resulting weld will have inferior mechanical properties. By using a cored wire in conjunction with a pulsed electric arc welding program, the present inventors have found that less manganese and silicon may be included in the core without adversely affecting the bead shape or running characteristics, thereby resulting in superior mechanical properties in the resultant weld.

In a preferred form of this aspect of the invention, the core contains from 4 to 15%, and preferably 6 to 10% of elemental manganese and from 2 to 8% and preferably from 2.5 to 5% elemental silicon.

The above electrode is suitable for pulsed arc welding with the following pulse parameters:

| Pulse Energy | 8 to 250 J and preferably 10 to 120 J |
| Pulse Frequency | 10 to 500 Hz and preferably 15 to 350 Hz |
| Background Current | 8 to 250 A and preferably 10 to 100 A |
| Wire Feed Speed | 1 to 20 m/min and preferably 4 to 17 m/min |

In a particularly preferred form of this aspect, the core composition is as defined below and the pulse parameters of the pulsed electric arc welding program suitable for use with the cored wire are as follows:
Wire Diameters: 0.9. to 1.8 mm
Shielding Gas: Argon-carbon dioxide mixtures containing 2 to 25% $CO_2$ and, in some cases, up to 3% $O_2$.
Proportion of core:
15 to 25% of total wire weight may be core
preferably 17 to 23% of core
specifically 21% core for 1.6 mm dia wires and 1.2 mm dia wires.

| | %age of Core | |
| Core Composition | Broad Range | Preferred Range |
| --- | --- | --- |
| Source of elemental Mn (such as manganese powder or ferromanganese) | 4 to 12 (as Mn) | 6 to 10 |
| Source of elemental Si (such as silicon powder or ferrosilicon) | 2 to 8 (as Si) | 2.5 to 5 |
| Source of Ti (such as ferrotitanium) | 0 to 1 (as Ti) | 0.2 to 0.5 |
| Fused mixed oxide (Containing approximately 10% MgO, 15% MnO, 10% $Al_2O_3$, 5% CaO, 60% $SiO_2$) | 0 to 1.5 | 0.2 to 1.0 |
| Source of B (such as ferroboron) | 0 to 0.05 (as B) | 0.005 to .05 (as B) |
| Source of elemental Cr (such as chromium or ferrochromium) | 0 to 2 | depends on alloy required |
| Source of Ni (such as nickel powder) | 0 to 20 | depends on alloy required |
| Source of Mo (such as ferromolybenum | 0 to 5 | depends on alloy required |
| Iron powder | remainder | remainder |

| Pulse Parameters | Range |
| --- | --- |
| Pulse width (ms) | 2 to 6 |
| Peak current (A) | 350 to 550 |
| Minimum Pulse Frequency (Hz) | 25 to 100 |
| Maximum Pulse Frequency (Hz | 120 to 350 |
| Minimum Background Current (A) | 10 to 50 |
| Maximum Background Current (A) | 20 to 100 |
| Minimum Wire Speed (m/min) | 1.26 to 3.78 |
| Maximum Wire Speed (m/min) | 5.20 to 15.60 |

The specific combination of parameters needs to be optimized for each specific wire.

In a fourth aspect of the present invention, there is provided a method of pulsed electric arc welding utilising a cored electrode wire containing a metallic core, characterised in that the electric arc welding apparatus is programmed with the following pulse parameters:

| Pulse Energy | 8 to 250 J and preferably 10 to 120 J |
| Pulse Frequency | 10 to 500 Hz and preferably 15 to 350 Hz |
| Background Current | 8 to 250 A and preferably 10 to 100 A |
| Wire Feed Speed | 1 to 20 m/min and preferably 4 to 17 m/min |

More specifically, the following parameters may be used:

| Pulse Parameters | Range |
| --- | --- |
| Pulse width (ms) | 2 to 6 |
| Peak current (A) | 350 to 550 |
| Minimum Pulse Frequency (Hz) | 25 to 100 |
| Maximum Pulse Frequency (Hz) | 120 to 350 |
| Minimum Background Current (A) | 10 to 50 |
| Maximum Background Current (A) | 20 to 100 |
| Minimum Wire Speed (m/min) | 1.26 to 3.78 |
| Maximum Wire Speed (m/min) | 5.20 to 15.60 |

DESCRIPTION OF PREFERRED EMBODIMENTS

Several preferred embodiments of each of the above aspects of the invention will now be described in greater detail. The examples of preferred embodiments of the basic cored electrode wire resulted from substantial experimentation.

The welding power supply used was a Welding Industries of Australia CDT Pulse Welder. A personal computer was attached, via a serial link, to the pulse program storage area of the power supply controls. This allowed any of the ten pulse parameters in the pulse programme being used to be altered at will. A commercial package would include supply of an EPROM for installation into the CDT pulse welder or other pulse welder, with the optimum pulse program for a specific wire.

Example 1

Basic wire-pulse combinations for joining HY80 steel

One of the early experimental wires of 1.6 mm diameter was chosen and an exercise undertaken to find a combination of pulse parameters which gave optimum operating behaviour over a wide current range. This resulted in a pulse program which gave good welding behaviour, a flat to slightly convex fillet shape and very little spatter over the welding current range 130 to 350 A. Furthermore, the lower end of this range (about 130 to 150 A) could be used for positional welding with slightly convex but acceptable vertical and overhead stringer beads being achievable. Weave techniques allowed the production of good profile positional fillet welds.

Measurements were made of the variation of deposition rate and efficiency with welding current using a representative wire and pulse program. The deposition rate results, together with those obtained previously for a commercially available basic flux cored wire under steady current conditions are given in FIG. 1. These show that higher deposition rates at given current occur under pulsed conditions and that the process under development can give deposition rates of up to 7 kg of weld metal/hour at usable welding current. The deposition efficiency of the experimental wire was 95 to 97% across the current range.

Figure 1:
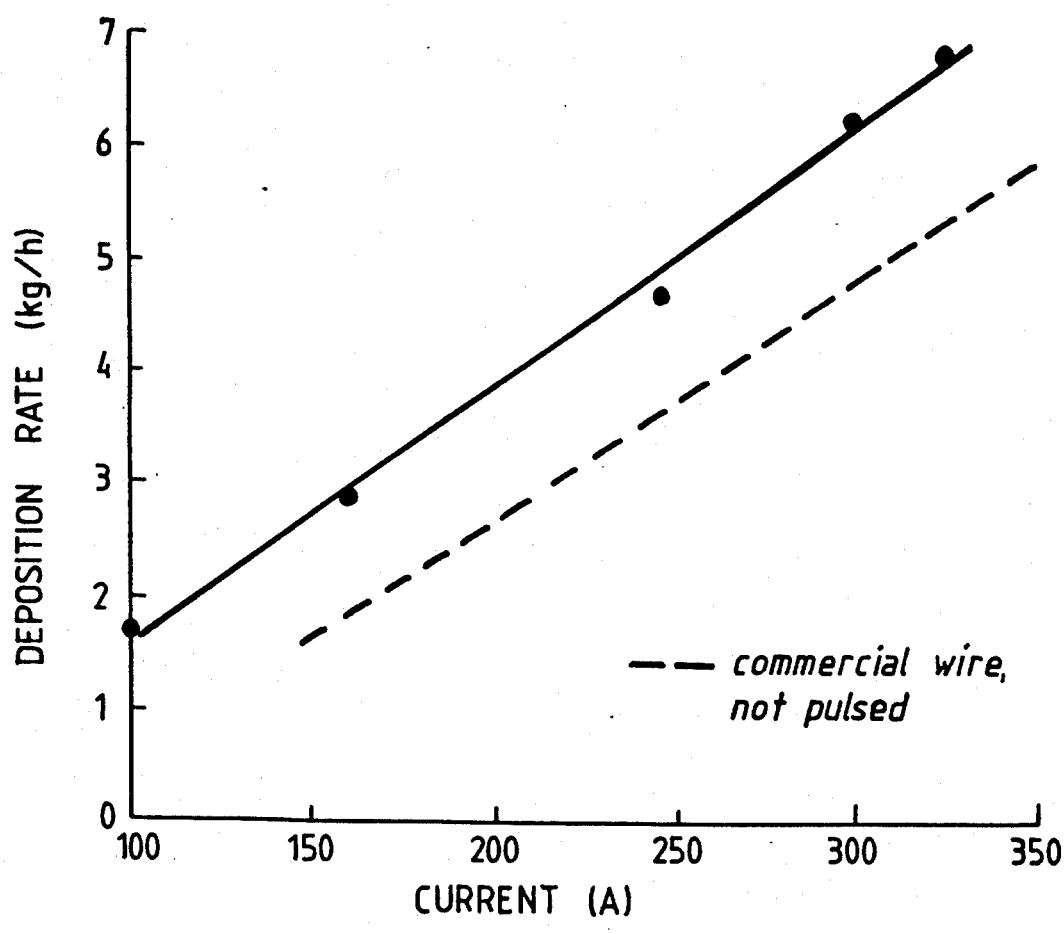
FIG. 1 is a graph showing the variation of deposition rate with welding current for a basic cored wire/pulsed welding process embodying the invention compared to that normally obtained from a non-pulsed commercially available basic cored wire.

It should be noted that the FIG. 1 graph of deposition rate against cement applies to any 1.6 mm diameter basic wire embodying the invention under pulse conditions.

A series of experimental wires were formulated to investigate the influence of alloying additions, principally Mn, Ni, Mo, Ti and B, on the all-weld-metal mechanical properties. The Table below gives the nominal deposit compositions aimed for, and classifies the wires according to the general approach used. The weld metal from all wires contained approximately 0.06% C and 0.3 to 0.4% Si.

| Wire No. | General Class | Nominal Composition (wt %) | | | | | |
|---|---|---|---|---|---|---|---|
| | | Mn | Ni | Mo | Ti | B | Other |
| 1 | Not microalloyed | 1.5 | 1.6 | 0.25 | — | — | |
| 2 | Not microalloyed | 1.2 | 1.6 | 0.25 | — | — | |
| 3 | Not microalloyed | 1.5 | 2.2 | 0.25 | — | — | |
| 4 | Not microalloyed | 1.2 | 2.2 | 0.25 | — | — | |
| 5 | Not microalloyed | 1.0 | 3.0 | 0.25 | — | — | |
| 6 | Ti addition | 1.5 | 1.6 | 0.25 | 0.04 | — | |
| 7 | Ti addition | 1.2 | 1.6 | 0.25 | 0.04 | — | |
| 8 | Ti addition | 1.2 | 2.2 | 0.25 | 0.04 | — | |
| 9 | Ti addition | 1.0 | 3.0 | 0.25 | 0.04 | — | |
| 10 | Ti + 25 ppm B | 1.5 | 1.6 | 0.25 | 0.04 | .0025 | |
| 11 | Ti + 25 ppm B | 1.2 | 1.6 | 0.25 | 0.04 | .0025 | |
| 12 | Ti + 25 ppm B | 1.2 | 2.2 | 0.25 | 0.04 | .0025 | |
| 13 | Ti + 25 ppm B | 1.0 | 3.0 | 0.25 | 0.04 | .0025 | |
| 14 | Ti + 50 ppm B | 1.5 | 1.6 | 0.25 | 0.04 | .005 | |
| 15 | Ti + 50 ppm B | 1.2 | 1.6 | 0.20 | 0.04 | .005 | |
| 16 | Ti + 50 ppm B | 1.2 | 2.2 | 0.25 | 0.04 | .005 | |
| 17 | Ti + 50 ppm B | 1.0 | 3.0 | 0.25 | 0.04 | .005 | |
| 18 | Ti + 50 ppm B no Mo | 1.5 | 1.6 | — | 0.04 | .005 | |
| 19 | Ti + 50 ppm B no Mo | 1.2 | 1.6 | — | 0.04 | .005 | |
| 20 | Ti + 50 ppm B no Mo | 1.2 | 1.6 | — | 0.04 | .005 | .01 Al |
| 21 | Ti + 50 ppm B no Mo | 1.2 | 1.6 | — | 0.04 | .005 | .02 Al |
| 22 | Ti + 50 ppm B no Mo | 1.2 | 1.6 | — | 0.04 | .005 | |
| 23 | Ti + 50 ppm B no Mo | 1.0 | 3.0 | — | 0.04 | .005 | |

Test plates were welded from each of these wires using the pulse program developed. The parent plate was C—Mn steel (250 Grade) of 19 mm thickness while the joint preparation and interpass temperature were as specified by the American Welding Society (ANSI/AWS A5. 20-79, 1978) for all-weld test plates. Welding was done in the flat position with mechanized travel and a heat input of 1.7 kJ/mm. One all-weld-metal tensile test specimen (50 mm gauge length) and three to five Charpy V-notch impact specimens were taken from each test plate. Charpy testing was done at −51° C.

Figure 2:
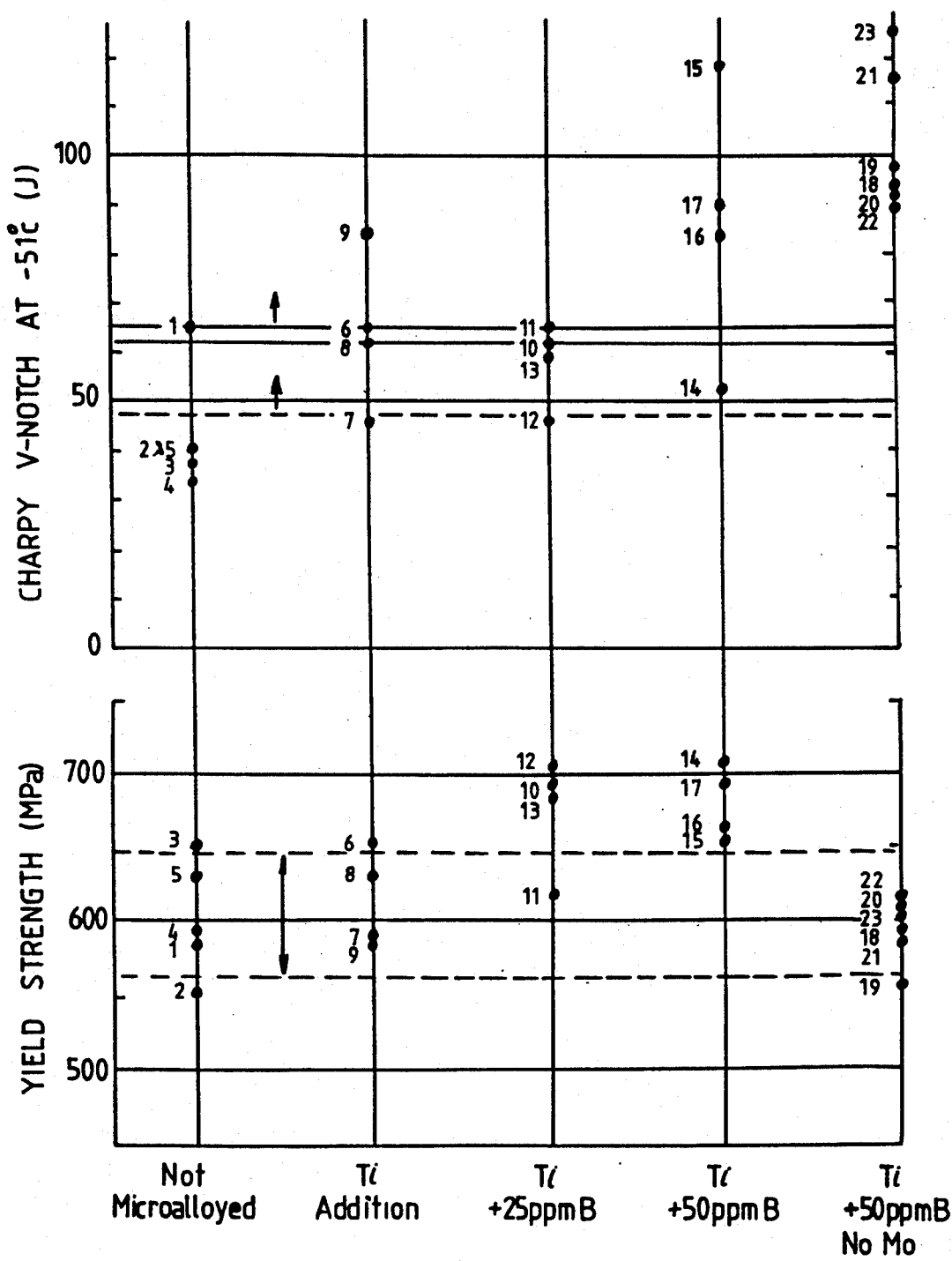
FIG. 2 is a graphical summary of yield strength and Charpy impact results obtained from wires embodying the invention.
Figure 3:
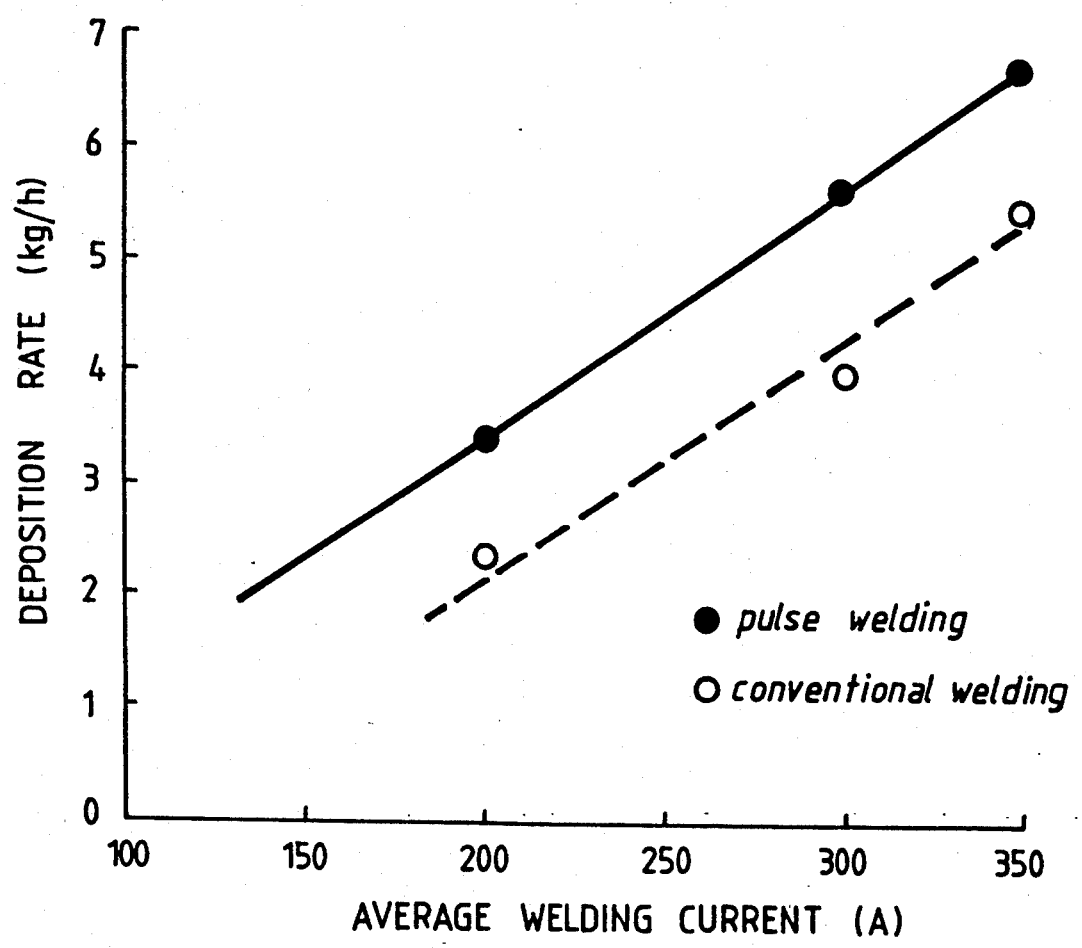
FIG. 3 is a graph showing the variation of deposition rate with welding current for a metal cored wire/pulsed welding process embodying the invention compared with a conventional metal cored wire using non-pulsed welding.

FIG. 2 is a schematic representation of the impact and tensile results obtained using the wire numbers from the table. Also marked on this figure are the minimum Charpy values specified and the range of yield strength values specified. This figure illustrates several important features of the results. It is apparent that premium Charpy results, of above say 100 J at −51° C., were only obtained with wires microalloyed with Ti and 50 ppm B. These premium Charpy results could be obtained using two distinct Mn—Ni combinations: 1.2% Mn-1.6% Ni with additions of 0.2% Mo or 0.02% of Al (wires 15 and 21); or 1.0% Mn-3.0% of Ni with no further addition (wire 23).

The yield strength results show that, of the wires giving premium Charpy values, wires 21 and 23 are within the range specified while wire 15 is marginally too high. Wires 15 and 23 gave 22% tensile elongation while wire 21 gave 26%.

Diffusible hydrogen in weld metal from these wires was found to be 2 to 3 ml/100 g of weld metal using the IIW procedure and a gas chromatography measuring system.

Metallographic examination revealed that the as-welded microstructure from wires giving premium impact properties contained at least 90% of fine grained constituents nucleated within prior austenite grains, such as acicular ferrite and intragranular polygonal ferrite.

Based on the all-weld-metal results described above wires 15, 18, 21 and 23 were selected for further assessment. Flat position test plates were welded from 16 mm thick HY80 steel using the "groove weld metal test" geometry described in U.S. Military Specification MIL-E-24403/2A (SH), 1983. Heat input was approximately 1.7 kJ/mm. From these test plates one all-weld tensile specimen, ten Charpy specimens and three dynamic tear specimens were machined. Half of the Charpy specimens were tested at −18° C. and half at −51° C. while the dynamic tear tests were done at −29° C. The table below lists the average values of the results.

| Wire No. | Tensile Yield (MPa) | Elongation (%) | Charpy V-notch Av at −18 (J) | Av at −51° C. (J) | Dynamic Tear Av at −29° C. (J) |
| --- | --- | --- | --- | --- | --- |
| 15 | 687 | 24 | 92 | 50 | 419 |
| 18 | 673 | 22 | 118 | 64 | 584 |
| 21 | 664 | 23 | 120 | 74 | 528 |
| 23 | 638 | 23 | 113 | 87 | 676 |

The yield strengths are considerably increased, by between 35 and 90 MPa, compared to the all-weld-metal results. This is due to incorporation in the weld of alloying elements from the parent plate and, as a result, wires 15, 18 and 21 (marginally) give yield strength values which are too high. Wire 23 has yield strength and elongation properties meeting the requirements of the U.S. Military Specification referred to above. All wires meet the dynamic tear requirements of the U.S. Military Specification.

Overall therefore wire 23, which gives a nominal weld metal composition of 1% Mn, 3% Ni plus microalloying additions of Ti and B, gives welds in HY80 steel having the best strength, elongation and impact properties.

The core composition and specific pulse parameters used for wire 23 are listed below:

| Core Composition | % by weight |
| --- | --- |
| Iron powder | 64.6 |
| Manganese powder | 4.1 |
| Ferrosilicon | 4.1 |
| Fluorspar | 5.3 |
| Marble | 4.1 |
| Silica | 0.4 |
| Fused mixed oxide | 1.0 |
| Nickel powder | 13.0 |
| Ferrotitanium | 1.0 |
| Iron/Ferroboron agglomerate | 2.4 |

| Pulse parameters | |
| --- | --- |
| Pulse width | 3.5 ms |
| Peak current | 520 A |
| Minimum frequency | 40 Hz |
| Maximum frequency | 160 Hz |
| Minimum background current | 35 A |
| Maximum background current | 35 A |
| Minimum wire speed (m/min) | 2.08 |
| Maximum wire speed (m/min) | 9.10 |

It will be appreciated that any combination of pulse parameters which achieve the more general pulse parameters defined above will be satisfactory and will be open to selection by an experienced operator.

The following examples of preferred basic flux wires for joining normal structural steels resulted from the above tests and further experimentation:

Example 2

Wire of 1.6 mm diameter with 23% fill for joining normal structural grade steels using Argon—18% CO$_2$ shielding gas. (Wire 244, Test plate MI)

| Core Composition | % by weight |
| --- | --- |
| Iron powder | 76.8 |
| Silico manganese | 9.8 |
| Ferrosilicon | 2.6 |
| Fluorspar | 5.3 |
| Marble | 4.1 |
| Silica | 0.4 |
| Fused mixed oxide | 1.0 |

| Pulse parameters | |
| --- | --- |
| Pulse width | 4.8 ms |
| Peak current | 500 A |
| Minimum frequency | 37.8 Hz |
| Maximum frequency | 132 Hz |
| Minimum background current | 34 A |
| Maximum background current | 40 A |
| Minimum wire speed (m/min) | 2.47 |
| Maximum wire speed (m/min) | 7.80 |

Operation

Gives good operation and bead shape over entire range for flat and horizontal welding positions and gives all-position welding capability at low wire feed speeds.

| Weld Metal | | |
| --- | --- | --- |
| Composition (wt %) | C | 0.09 |
| | Mn | 1.24 |
| | Si | 0.41 |
| Tensile properties | 560 MPa tensile strength, 30% elongation | |
| Impact properties | average of 128 J at −20° C. in Charpy test | |
| Diffusible hydrogen | less than 3 ml/100 g | |

Example 3

Wire of 1.2 mm diameter with 21% fill for joining normal structural grade steels using Argon—18% CO$_2$ shielding gas. (Wire 244/9, test plate PT)

| Core Composition | % by weight |
| --- | --- |
| Iron powder | 74.2 |
| Siliso manganese | 10.9 |
| Ferrosilicon | 2.9 |
| Fluorspar | 5.9 |
| Marble | 4.6 |
| Silica | 0.4 |

-continued

| Core Composition | % by weight |
| --- | --- |
| Fused mixed oxide | 1.1 |

| Pulse parameters | |
| --- | --- |
| Pulse width | 2.5 ms |
| Peak current | 480 A |
| Minimum frequency | 75 Hz |
| Maximum frequency | 206 Hz |
| Minimum background current | 25 A |
| Maximum background current | 25 A |
| Minimum wire speed (m/min) | 4.42 |
| Maximum wire speed (m/min) | 11.83 |

Operation

Gives good operation and bead shape over entire range for flat and horizontal welding positions and gives all-position welding at low and intermediate wire speeds.

| Weld Metal | |
| --- | --- |
| Composition (wt %) | C .09 |
| | Mn 1.40 |
| | Si 0.43 |
| Tensile properties | 605 MPa tensile strength, 25% elongation |
| Impact properties | average of 116 J at −20° C. in Charpy test |
| Diffusible hydrogen | less than 3 ml/100 g |

Example 4

Pulsed Basic Wire for High Strength Steel

Wire of 1.6 mm diameter with 23% fill to American Welding Society classification E111T5-K4 for joining high strength steels and using Argon—18% $CO_2$ shielding gas (Wire 2106, test plate SN)

| Core Composition | % by weight |
| --- | --- |
| Iron Powder | 60.7 |
| Manganese powder | 6.7 |
| Ferrosilicon | 4.5 |
| Fluorspar | 5.3 |
| Marble | 4.1 |
| Silica | 0.4 |
| Fused mixed oxide | 1.0 |
| Ferrochromium | 0.9 |
| Nickel powder | 10.4 |
| Ferromolybdenum | 2.1 |
| Ferrotitanium | 1.5 |
| Iron/Ferroboron agglomerate | 2.4 |

| Pulse parameters | |
| --- | --- |
| Pulse width | 4.8 ms |
| Peak current | 475 A |
| Minimum frequency | 37.8 Hz |
| Maximum frequency | 165 Hz |
| Minimum background current | 45 A |
| Maximum background current | 45 A |
| Minimum wire speed (m/min) | 2.39 |
| Maximum wire speed (m/min) | 8.06 |

Operation

Gives good operation and bead shape over entire range for flat and horizontal welding positions and gives all-position welding capability at low wire feed speeds.

| Weld Metal | |
| --- | --- |
| Composition (wt %) | 0.06% C, 1.49% Mn, 0.39% Si, 2.39% Ni, 0.30% Cr, 0.35% Mo, 0.04% Ti, 0.0066% B. |
| Tensile properties | 711 MPa yield strength, 809 MPa tensile strength, 20% elongation. |
| Impact properties | average of 47 J at −51° C. in Charpy test |
| Diffusible hydrogen | less than 3 ml/100 g |

The results show that the combination of basic-flux cored wires and specifically programmed pulse welding provides a versatile welding process with enhanced usability. High deposition downhand welding and an all-position capability can be achieved with a single pulse program by altering the wire feed speed and hence the welding current. Furthermore, the impact and tensile properties obtained from the alloy combination of wire 23 when using this process meet or exceed the requirements of joining HY80 steel. The requirement on diffusible hydrogen level is also readily met.

These results suggest that this combination should be suitable for all-position joining of such steels and of offering considerable advantages over presently available processes.

The principal advantage of the above embodiments compared to conventional basic wire welding is in the improved operating behaviour and bead shape. The basic wire-pulse welding combination allows a much wider range of average welding currents to be used and makes all-position welding with basic wires practical. An example of the extended current range achieved is that, for a 1.6 mm diameter basic wire and pulse welding this range is 130 to 350 A whereas, with convention welding the range is 230 to 300 A.

This advantage is illustrated in the following example of a test-plate welded in the vertical position using pulse welding, it being appreciated that it is not practical to produce such a test-plate by conventional means.

Example 5

Wire of 1.2 mm diameter with 21% fill for joining normal structural grade steels using Ar. 18% $CO_2$ shielding gas (wire 244/9, test-plate LB63).

Core Composition and Pulse Parameters (as in Example 3).

Operation

Good vertical position welding operation illustrated by fact that sound Vee-butt test plate produced to Lloyds Register of Shipping "Approval of Welding Consumables" requirements.

| Weld | |
| --- | --- |
| Composition (wt %) | c .07 |
| | Mn 1.38 |
| | Si .51 |
| Impact Properties | average of 96 J at −20° C. in Charpy test |
| Transverse tensile test | met requirements of Lloyds Register of Shipping. |
| Face and Root bend tests | met requirements of Lloyds Register of Shipping. |

In addition to the above described advantages, the basic cored wires contain significantly less slag forming components in the core thereby resulting in less troublesome welding performance while maintaining the necessary quality of the weld.

Tests similar to the above were conducted in relation to various metal cored wires, and the following examples of preferred embodiments resulted:

EXAMPLES

Metal Cored Wires

Example 6

Wire of 1.6 mm diameter with 21% fill for joining normal structural grade steels using Argon—18% $CO_2$ shielding gas. (Wire 345, Test plate NA)

| Core Composition | % by weight |
| --- | --- |
| Iron powder | 83.2 |
| Manganese powder | 7.3 |
| Ferrosilicon | 4.4 |
| Silicon powder | 1.3 |
| Ferrotitanium | 0.8 |
| Fused mixed oxide | 0.4 |
| Ferroboron/iron powder agglomerate | 2.6 |

| Pulse parameters | | |
| --- | --- | --- |
| Pulse width | 4.5 | ms |
| Peak current | 500 | A |
| Minimum frequency | 40 | Hz |
| Maximum frequency | 150 | Hz |
| Minimum background current | 33 | A |
| Maximum background current | 45 | A |
| Minimum wire speed (m/min) | 2.60 | |
| Maximum wire speed (m/min) | 8.45 | |

Operation

Very good operation and bead shape over entire range for flat and horizontal welding positions. Has all-position welding capability at lower wire feed speeds.

| Weld Metal | |
| --- | --- |
| Composition (wt %) | 0.05 C, 1.31 Mn, 0.62 Si, 0.04 Ti, 0.0065 B |
| Tensile properties | 598 MPa tensile strength, 24% elongation |
| Impact properties | average of 109 J at −20° C. in Charpy test |

Example 7

Wire of 1.2 mm diameter with 21% fill for joining normal structural grade steels using Argon—18% $CO_2$ shielding gas. (Wire 345, Test plate OX)

| Core Composition | % by weight |
| --- | --- |
| Iron powder | 83.5 |
| Manganese powder | 7.3 |
| Ferrosilicon | 4.4 |
| Silicon powder | 1.3 |
| Ferrotitanium | 0.8 |
| Fused mixed oxide | 0.4 |
| Ferroboron/iron powder agglomerate | 2.6 |

| Pulse parameters | | |
| --- | --- | --- |
| Pulse width | 2.6 | ms |

*-continued*

| Pulse parameters | | |
| --- | --- | --- |
| Peak current | 400 | A |
| Minimum frequency | 32 | Hz |
| Maximum frequency | 278 | Hz |
| Minimum background current | 12 | A |
| Maximum background current | 78 | A |
| Minimum wire speed (m/min) | 1.95 | |
| Maximum wire speed (m/min) | 11.96 | |

Operation

Very good operation and bead shape over entire range for flat and horizontal welding positions plus very good all-position welding capability at low and intermediate wire feed speeds.

| Weld Metal | |
| --- | --- |
| Composition (wt %) | 0.06% C, 1.49% Mn, 0.62 Si, 0.04% Ti, 0.0055% B |
| Tensile properties | 589 MPa tensile strength, 23% elongation |
| Impact properties | average of 123 J at −20° C. in Charpy test |

There are two principal advantages of using the above metal cored wires with pulsed welding compared to conventional welding with metal cored wire. Firstly, in common with the above basic wires, the range of usable welding currents is much wider so that all-position welding becomes practical at the lower currents. With 1.6 mm diameter metal cored wire and pulsed welding for example the range of average current that is usable is 120 to 350 A while, with conventional welding it is 280 to 340 A. This could be illustrated using an example, along similar lines to that above for the basic wire, of results from a vertical weld.

The second principal advantage concerns the improved weld mechanical properties obtained. This difference between pulse and conventional metal cored wires is illustrated by the following:

| Wire Number | 328 | 345 | |
| --- | --- | --- | --- |
| Welding Method | conventional | pulsed | see Example 6 for details |
| Test plate type | all weld metal | all weld metal | |
| Weld Composition (wt %) | | | |
| C | 0.04 | 0.05 | |
| Mn | 1.60 | 1.31 | |
| Si | 1.04 | 0.62 | |
| Weld Properties | | | |
| Impact (CVN at −20° C.) | 64 J | 109 J | |
| Tensile Strength | 622 MPa | 598 MPa | |
| Tensile Elongation | 23% | 24% | |

The difference in impact properties is most important because it allows the wire/pulse combination to be used in more critical applications. In addition to these advantages, the amounts of manganese and silicon are reduced, thereby improving the mechanical properties of the weld, without compromising the running characteristics and bead shape of the weld.

Example 8

Pulsed Metal Core Wire for High Strengh Steel

Wire of 1.6 mm diameter with 21% fill to American Welding Society classification E111TG-K3 for joining high strength steels and using Argon—18% CO₂ shielding gas (Wire 359, test plate UH)

| Core Composition | % by weight |
|---|---|
| Iron powder | 65.5 |
| Manganese powder | 9.6 |
| Ferrosilicon | 3.8 |
| Ferrotitanium | 0.8 |
| Silicon powder | 1.1 |
| Fused mixed oxide | 0.4 |
| Iron/Ferroboron agglomerate | 2.6 |
| Nickel powder | 12.7 |
| Ferromolybdenum | 3.5 |

| Pulse parameters | |
|---|---|
| Pulse width | 5.2 ms |
| Peak current | 460 A |
| Minimum frequency | 38 Hz |
| Maximum frequency | 152 Hz |
| Minimum background current | 40 A |
| Maximum background current | 40 A |
| Minimum wire speed (m/min) | 2.39 |
| Maximum wire speed (m/min) | 7.56 |

Operation

Very good operation and bead shape over entire range for flat and horizontal welding positions. Has all-position welding capability at lower wire feed speeds.

| Weld Metal | |
|---|---|
| Composition (wt %) | 0.05% C, 1.49% Mn, 0.40% Si, 2.6% Ni, 0.12% Cr, 0.56% Mo, 0.04% Ti, 0.005% B |
| Tensile properties | 686 MPa yield strength, 797 MPa tensile strength, 24% elongation. |
| Impact properties | average of 41 J at −18° C. in Charpy test |
| Diffusible hydrogen | 2 to 4 ml/100 g |

It will be appreciated from the above that the improved cored electrode wires enable pulsed electric arc welding to be performed and result in welds which are superior to welds performed by known cored electrode wires using non-pulsed electric arc welding techniques.

The various components of the core of the wire may be modified without detracting from the advantages provided by the present invention. For example, the various alloying components may be modified to suit the required weld metal properties. Similarly, the components of the fused metal oxide used in each core may be modified to suit the user's requirements provided the core contains sufficient easily ionizable material to result in satisfactory improvement of the weld quality.

We claim:

1. A cored electrode wire for pulsed electric arc welding, characterised in that the core constitutes from 15% to 28% of the weight of the wire and the slag forming components contained in said core include from 2.5 to 12% calcium fluoride, from 2 to 8% calcium carbonate, from 0.2 to 2% silicon dioxide, from 0.5 to 1.5% of a fused mixed oxide and no intentional aluminum, said slag forming components therefore being present at a lower level than the slag forming components which must be contained in a cored wire suitable for non-pulsed arc welding, said core components excluding silicate components.

2. The electrode wire of claim 1 wherein said core includes from 2.5 to 8% calcium fluoride, from 2 to 6% calcium carbonate, from 0.2 to 1% silicon dioxide and from 0.75 to 1.25% fused mixed oxide.

3. The electrode wire of claim 2, wherein said fused mixed oxide contains approximately 10% MgO, 15% MnO, 10% Al₂O₃, 5% CaO, 60% SiO₂.

4. A cored electrode wire for pulsed electric arc welding, in which the wire diameter is from 0.9 to 1.8 mm, said core have from 3 to 12% elemental manganese, from 2 to 7% elemental silicon, from 2.5 to 12% calcium fluoride, from 2 to 8% calcium carbonate, from 0.2 to 2% silicon dioxide, from 0.5 to 1.5% fused mixed oxide, from 0 to 1.5% elemental chromium, from 0 to 15% nickel, from 0 to 5% molybdenum, from 0 to 1.5% titanium, from 0 to 0.045% boron, the remainder of the core composition being iron powder, said core components excluding silicate components.

5. The electrode wire of claim 4, wherein the core comprises from 18 to 25% of the weight of the wire, said core comprising from 5 to 9% elemental manganese, from 2 to 5% elemental silicon, from 2.5 to 8% calcium fluoride, from 2 to 6% calcium carbonate, from 0.2 to 1% silicon dioxide, from 0.75 to 1.25% fused mixed oxide, from 0 to 0.8% titanium, and from 0 to 0.033% boron.

6. A pulsed electric arc welding apparatus operating with the following welding pulse parameters:

| Pulse Energy | 8 to 250 J |
|---|---|
| Pulse Frequency | 10 to 500 Hz |
| Background Current | 8 to 250 A |
| Wire Feed Speed | 1 to 20 m/min | and including a cored electrode wire wherein the core constitutes 15-28% of the weight of the wire and contains slag-forming components which include from 2.5-12% calcium fluoride, 2-8% calcium carbonate, 0.2-2% silicon dioxide, 0.5-1.5% fused mixed-oxide and no intentional aluminum, and said core excludes silicate components.

7. The pulsed electric arc welding apparatus of claim 6 operating with the following welding pulse parameters:

| Pulse Energy | 10 to 120 J |
|---|---|
| Pulse Frequency | 15 to 350 Hz |
| Background Current | 10 to 100 A |
| Wire Feed Speed | 4 to 17 m/min |

8. The electrode wire of claim 7, wherein the pulse parameters are:

| Pulse width (ms) | 2 to 6 |
|---|---|
| Peak current (A) | 400 to 550 |
| Minimum Pulse Frequency (Hz) | 15 to 80 |
| Maximum Pulse Frequency (Hz) | 120 to 300 |
| Minimum Background Current (A) | 15 to 50 |
| Maximum Background Current (A) | 15 to 80 |
| Minimum Wire Speed (m/min) | 1.56 to 4.55 |
| Maximum Wire Speed (m/min) | 6.50 to 16.90 |

9. The pulsed electric arc welding apparatus of claim 6, wherein the pulse parameters are:

| Pulse width (ms) | 2 to 6 |
|---|---|
| Peak current (A) | 400 to 550 |

| -continued | |
|---|---|
| Minimum Pulse Frequency (Hz) | 15 to 80 |
| Maximum Pulse Frequency (Hz) | 120 to 300 |
| Minimum Background Current (A) | 15 to 50 |
| Maximum Background Current (A) | 15 to 80 |
| Minimum Wire Speed (m/min) | 1.56 to 4.55 |
| Maximum Wire Speed (m/min) | 6.50 to 16.90 |

10. A cored electrode wire for use with pulsed electric arc welding, characterised in that the core constitutes from 15% to 28% of the weight of the wire and contains a metal powder composition having from 4 to 15% elemental manganese, and from 2 to 8% elemental silicon, the remainder of the core comprising fused mixed oxide, desired alloying components and iron powder, said core therefore containing less manganese and silicon than would be required for a cored wire for use with non-pulsed electric arc welding, said fused mixed oxide containing approximately 10% MgO, 15% MnO, 10% $Al_2O_3$, 5% CaO, 60% $SiO_2$.

11. The electrode wire of claim 10, wherein said core contains from 6 to 9% of elemental manganese and from 2.5 to 5% elemental silicon.

12. The electrode wire of claim 11, wherein said wire has a diameter of from 0.9 to 1.8 mm and the core comprises from 15 to 25% of the weight of the wire, said core composition comprising from 4 to 12% elemental manganese, from 2 to 8% elemental silicon, from 0 to 1% titanium, from 0 to 1.5% fused mixed oxide, from 0 to 0.05% boron, from 0 to 2% elemental chromium, from 0 to 20% nickel, from 0 to 5% molybdenum, the remainder of the core being iron powder.

13. A pulsed electric arc welding apparatus operating with the following pulse parameters:

| Pulse Energy | 8 to 250 J |
|---|---|
| Pulse Frequency | 10 to 500 Hz |
| Background Current | 8 to 250 A |
| Wire Feed Speed | 1 to 20 m/min | and including a cored electrode wire wherein said core constitutes from 15% to 28% of the weight of the wire and contains a metal powder composition having from 4 to 15% elemental manganese, and from 2 to 8% elemental silicon, the remainder of the core comprising fused mixed oxide, desired alloying components and iron powder, said core therefore containing less manganese and silicon than would be required for a cored wire for use with non-pulsed arc welding.

14. The pulsed electric arc welding apparatus of claim 13 operating with the following pulse parameters:

| Pulse Energy | 10 to 120 J |
|---|---|
| Pulse Frequency | 15 to 350 Hz |
| Background Current | 10 to 100 A |
| Wire Feed Speed | 4 to 17 m/min |

15. The pulsed electric arc welding apparatus of claim 14, wherein said pulse parameters are:

| Pulse width (ms) | 2 to 6 |
|---|---|
| Peak current (A) | 350 to 550 |
| Minimum Pulse Frequency (Hz) | 25 to 100 |
| Maximum Pulse Frequency (Hz) | 120 to 350 |
| Minimum Background Current (A) | 10 to 50 |
| Maximum Background Current (A) | 20 to 100 |
| Minimum Wire Speed (m/min) | 1.26 to 3.78 |
| Maximum Wire Speed (m/min) | 5.20 to 15.60 |

* * * * *